INVENTOR.
LOUIS BUSH

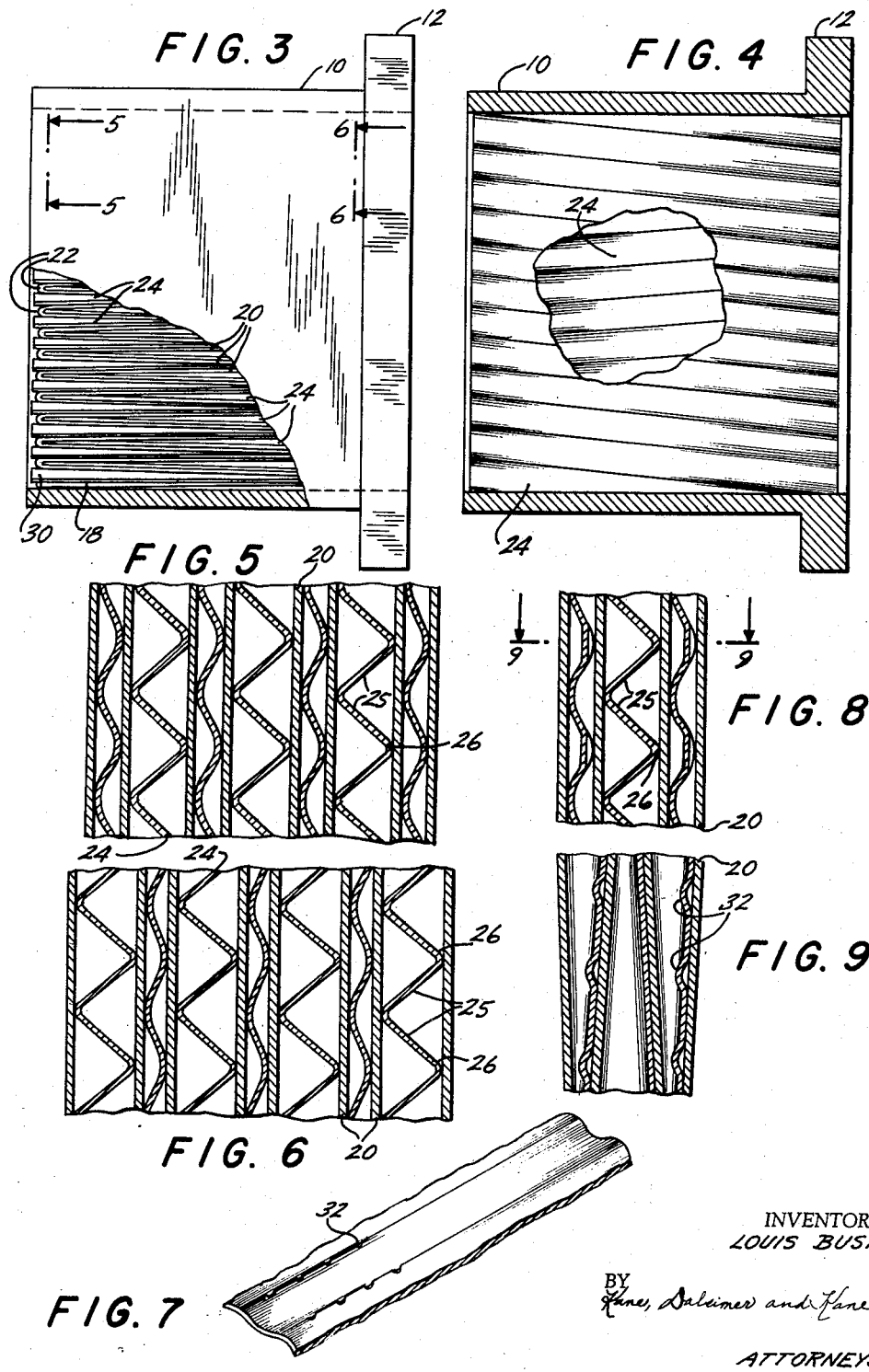

United States Patent Office 2,952,333
Patented Sept. 13, 1960

1

2,952,333
FILTERS

Louis Bush, Jamesport, N.Y., assignor to Flanders Filter, Inc., Riverhead, N.Y., a corporation of New York Filed Mar. 4, 1959, Ser. No. 797,188

3 Claims. (Cl. 183—71)

This invention relates to filters employed for the removal of impurities from air, or other gaseous streams, and more particularly to an improved filter construction for such purposes.

Air filters have been utilized in varied technological fields for many years. For example, the electronics industry employs air filters to extract foreign particles from the air in an effort to prevent the contamination of disassembled elements of electronic components such as vacuum tubes. In addition, such filters are often used in the circulating systems of large furnaces; and, in recent years, apparatus such as gas cooled reactors, coupled with other advances in technology, have placed an even greater burden on such filtering devices, and naturally increased the demand for more sophisticated filter constructions.

Accordingly, an object of this invention is to provide an improved filter construction of the type having an accordion-pleated sheet of filter media with corrugated separators between the pleat folds.

Another object is to provide such an improved filter construction which minimizes and prevents, under most contemplated circumstances, the tendency for adjacent separators to nest.

A further object is to provide a filter pack for such constructions that is more rigid; and, consequently, subject to negligible deformation and minimum filter media rupturing resulting from relatively light stresses induced by sagging or buckled separators.

Still a further object is to provide a filter pack for such constructions that is susceptible to less flutter or vibration in an air stream which might otherwise result in fatigue ruptures of the pack components, especially the filter media.

An important object is to provide such an improved filter construction wherein corrugated separators have their corrugations in substantial alignment with the direction of gas flow and are sufficiently offset with respect to one another to prevent undesirable separator nesting without impeding gas flow to an undesirable extent.

Another important object is to provide an improved filter construction having the foregoing characteristics wherein the corrugation crests of the separators vary and are so disposed that the effective filtering area of the filtering media is increased without any substantial inpairment of the gas flow.

A further important object is to provide an improved filter construction possessing the foregoing characteristics wherein the filter media may be relatively thin sheet material of high efficiency without the danger of it being subjected to stresses sufficient to cause rupturing thereof; and wherein each of the corrugated separators may be substantially identical but selectively disposed within the filter pack so that its corrugations are angularly offset with respect to those of adjacent separators.

An additional object is an improved filter pack having more separators and filter media pleats in a given frontal area by varying the height of the crests of the separator corrugations, while, at the same time, attaining efficient filtering and air flow by disposing the smaller crest heights of those separators in the upstream air pockets of the filter pack adjacent the downstream end of such packs where the smallest flow of air is present within such pockets and reversing such arrangement for those separators located on the downstream side.

Other objects and advantages will become apparent from the following description of the invention which is to be taken in conjunction with the accompanying drawings wherein:

Fig. 3 is a plan view of these assembled filter pack components with portions of the frame broken away and sectioned;

Fig. 4 is a side elevational view of this construction and sectioned to illustrate the relative disposition of adjacent corrugated separators;

Fig. 5 is a fragmentary sectional view taken along the line 5—5 of Fig. 3;

Fig. 6 is another fragmentary sectional view taken along the line 6—6 of Fig. 3;

Fig. 7 is a fragmentary and perspective view of another form of corrugated separator which may be desirable under certain conditions;

Fig. 8 is a fragmentary sectional view of a filter pack employing the corrugated separator illustrated in Fig. 7;

Fig. 9 is a fragmentary sectional view taken along the line 9—9 of Fig. 8 to further illustrate the disposition of the separator illustrated in Fig. 7.

Figure 1:
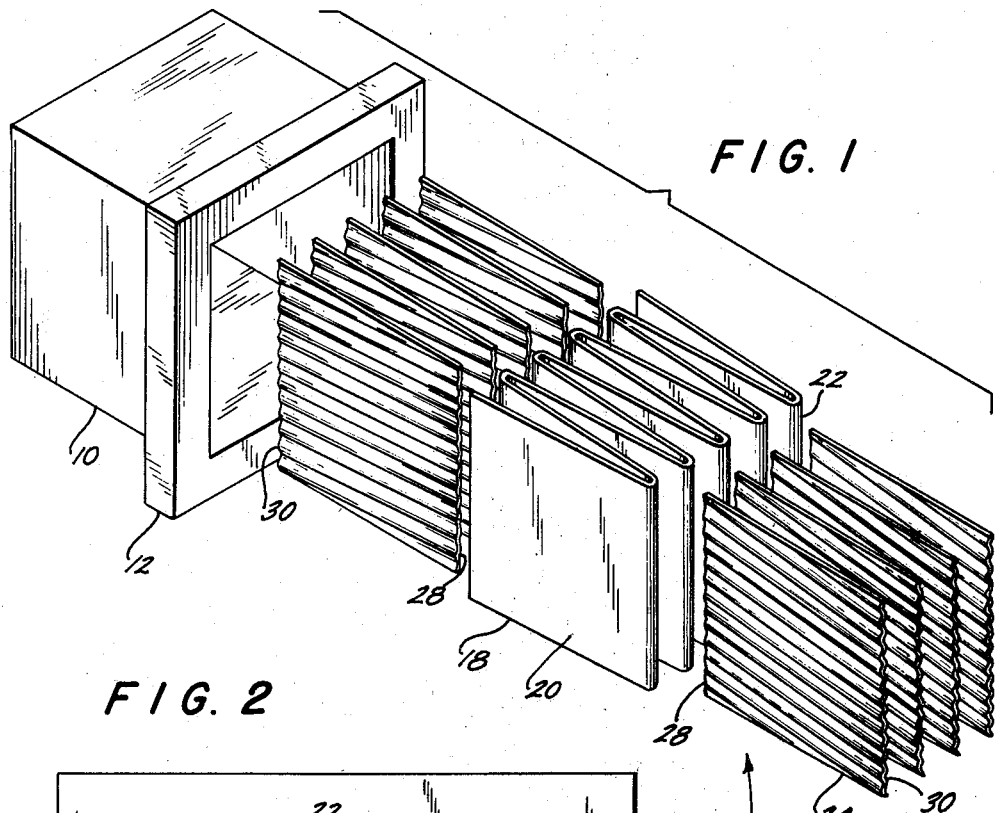
Fig. 1 is an exploded perspective view of a filter pack frame shown somewhat schematically together with an accordion-pleated sheet of filter media and corrugated separators constructed and arranged in accordance with the present invention.

In the drawings, the usual filter pack frame 10 is illustrated and includes the conventionally employed flange 12 along the periphery of its upstream end. This frame 10 is adapted to be received by the ordinary air or gas stream duct, or effectively placed to accomplish the intended filtering function. Naturally, the configuration and structure of this frame 10 will vary depending upon the apparatus with which it is to be associated. Furthermore, the frame 10 may be suitably formed from wood, such as plywood or plain wood, numerous metals, such as stainless steel, any one of a number of commercially available resinous materials having the desired characteristics for the intended purpose, and molded or cast ceramic fibers which are treated and properly baked to provide a substantially rigid structure.

A filter pack, generally indicated by the numeral 16, is adapted to be housed within the frame 10. The filter pack 16 includes an accordion-pleated sheet 18 of selected filter media. In this connection, relatively light-weight thin sheet material may be employed because of the reduced stresses and vibrations to encounter during substantially all conditions of use and abuse. Suitable filter media materials may include Fiberglas filter paper or other ceramic-type filter paper usually employed for such purposes. In addition, other perforate, porous or foraminous materials can be utilized for the filter media, including wire cloth and the like. The pleated filter sheet 18 will include a plurality of integrally hinged panels 20 defining pleat folds 22 both at the upstream or downstream end of the pleated filter sheet 18.

A number of corrugated or crimped separators 24 are interposed between adjacent pleat panels 20. Thus, these separators will be disposed in either the upstream or downstream pockets defined by the integrally hinged pleat panels 20. Each separator includes corrugations 25 extending across its side face. Each of these corrugations has a crest 26 defining a locus of points or axis extending obliquely or angularly with respect to the true longitudinal axis of such members which parallel the normal direction of flow of a gaseous stream. The separators 24 on the upstream side of the filter sheet 18 have their respective corrugation crests 26 disposed substantially parallel to the crests 26 of adjacent separators 24 on this side. On the other hand, the separators 24 located on the downstream side of the filter sheet 18 have their respective corrugation crests 26 parallel to the crests 26 of adjacent separators 24 on such side. However, the respective crests 26 of the corrugations 25 on the separators 24 located on the upstream side of the filter sheet 18 are preferably not parallel to the corrugation crests 26 of the separators 24 on the downstream side. In this connection, the corrugation crests 26 on the upstream side of the filter sheet 18 are designed and arranged to define linearly extending locus of points or axes providing one or more intersections with such locus or axes for the crests of the separators 24 disposed on the downstream side of the filter sheet 18. This disposition of separators 24 will be more clearly understood by referring to Figs. 1 and 4.

Figure 2:
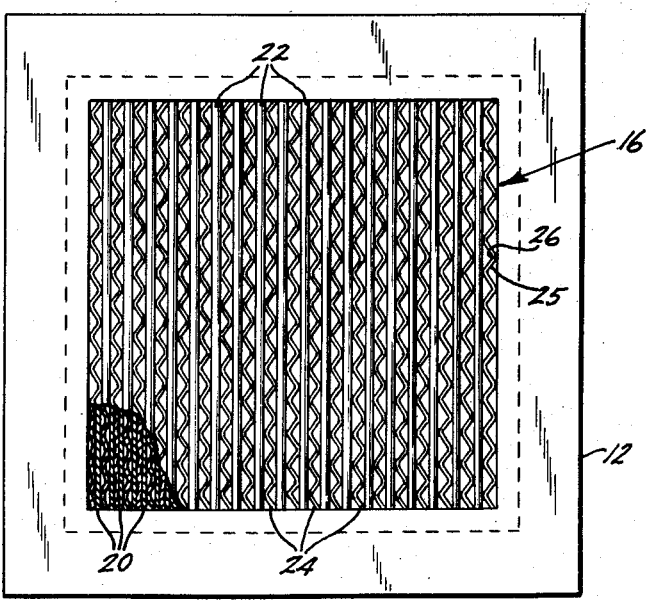
Fig. 2 is an elevational view of the assembled filter pack components in a mounting frame with certain parts broken away and sectioned.

In Figs. 2, 5 and 6, it will be observed that the air pockets defined by adjacent pleat panels 20 are further broken down or compartmented by separators 24. Since the separator corrugations 25 are only slightly offset or angularly disposed with respect to the contemplated direction of gas flow, the resistance to gas flow by such separators 24 is not materially increased and can even be considered negligible. Obviously, this arrangement of separators 24 does not require a difference in construction of alternate separators 24. On the contrary, all of the separators 24 in the filter pack 16 are substantially the same, but alternate separators are simply reversed by turning them approximately 180° to expose their opposed sides to adjacent separators 24 as they are placed in position. Thus, the corrugations 26 of adjacent separators 24 are not in alignment for nesting and, consequently, do not create or impart stresses to the intervening pleats of filter media, which are usually of a very weak and frail nature and readily susceptible to tearing or rupturing under even relatively light stresses. As a result of this inherent non-nesting characteristic of separators 24 made and arranged according to the present invention, the completed filter pack 16 is more rigid and less subject to deformation due to sagging or buckled separators, and, in addition, less susceptible to flutter or vibration in a gaseous stream which might otherwise result in fatigue ruptures.

It should be clear that the filtering action takes place by the passage of the particular gaseous stream through the sheet 18 of filter media, which cooperates to define the deep pockets in the filter pack 16. The separators 24 are employed to hold each individual pocket apart to permit the passage of air into and out of the respective pockets without interference from adjacent pockets. In operation, the pocket walls would be blown against the adjacent pockets, thereby blocking the air flow of the pockets if it were not for the proper spacing function of the individual separators 24. Under most circumstances, the separator 24 performs no filtering action. Suitable separator materials include kraft paper, asbestos paper, paper formed from resinous materials such as cellulose acetate, aluminum foil, ceramic fiber paper, glass paper, stainless foil and steel foil.

The present invention contemplates separators 24 having corrugations 25 appreciably lower in height at one end 28 than at the other end 30. It will be observed that in all cases the high ends of the corrugations 26 are located substantially adjacent the external surfaces of the pleat folds 22, whereas the corrugation ends 28 are disposed interiorly and adjacent the pleat panel hinges. This particular arrangement does not require the fabrication of different separators 24, but is accomplished by merely reversing alternate separators. It will be obvious that this arrangement permits gaseous flow to enter the frontal area of the filter pack 16 from an upstream direction through the channels formed by the high end 30 of the corrugations 25 on the separators 24 which are located on the upstream side of the accordion-pleated sheet 18 of filter media. A gaseous stream entering the filter pockets on the upstream side of the filter pack 16 is usually under slight pressure and, naturally, will expand the pockets to a slight degree. This pressure, along with the beveled or angularly disposed inner faces of the pleat panels 20 on the upstream side, will consequently force the flow of the gaseous stream through the walls of the pockets exposed to the upstream side. Since all of the gaseous stream to be filtered through the accordion-pleated filter 18 must pass through the upstream openings of the filter pack 16, it is desirable and more effective to maintain these upstream openings as large as possible in an effort to reduce any resistance to the gaseous flow.

The reduced corrugation ends 28 of the channels 24 on the upstream side of the accordion-pleated filter 18 are not deleterious to this gaseous flow because this flow will be most advantageously effected through the walls of the pleat panels 20, a gaseous flow extremely desirable for optimum filtration. In this connection, as the gas passes through the walls of the upstream pockets, the effective width of such upstream pockets can be decreased without encountering any harmful effects as a greater depth in the pocket is reached. On the downstream side of the filter pack 16 the downstream pocket walls are under external pressures which tend to collapse the respective pockets. The present invention locates the reduced height of the separators 24 at a position in the downstream pockets where it will provide less resistance to air flow and the largest height for such separators at a location where the largest flow can be expected and minimum resistance to flow extremely desirable. Consequently, this arrangement of filter pack offers minimum resistance to gaseous flow and substantially increases the effective filter medium area for a particular frontal filter pack area as a result of the angularity of the pleat panels 20. In this connection, it will be obvious that the number of separators 24 and filter media pleats 20 in a given frontal area can be materially increased because the effective height of a separator 24 is the mean of the sum of the height of the corrugations 25 at the elevated end 30 and the reduced end 28. Therefore, by means of the present invention, a filter of greater capacity is obtained size for size as compared to filters of orthodox design.

In addition to the foregoing, the crests of the corrugations 26 may be either indented or slotted at their reduced ends 28 in a manner substantially as illustrated in Figs. 7, 8 and 9. This structural modification may be employed where deemed advantageous when the nature and size of the filter pack design results in a corrugation top or crest which presents too large a contact area with the pleat panels 20, thereby sealing the contact area and, consequently, preventing the associated filtering media from providing a filtering function. The indentations 32 or their functional equivalent act as spacers and as a means for providing areas of substantially no sealing contact and, thusly, assure optimum filtering surface area, adjacent the reduced end 28 of the separators 24, for the accordion-pleated sheet 18 of filter media.

Thus, among others, the several objects of the invention, as aforenoted, are most effectively achieved. Obviously, numerous changes in construction might be resorted to without departing from the spirit of the invention as defined by the appended claims.

I claim:

1. A filter for a gaseous stream flowing in a particular direction comprising a plurality of layers of filtering media, each of said layers being integrally hinged to an adjacent layer and being formed from an accordion-pleated strip of filtering material, and corrugated separators disposed between said layers of filtering material and extending for a greater portion of the length and width thereof, said separators having corrugations extending substantially laterally with respect to the integrally hinged connection of the layers of filtering media and being adapted to be disposed in the general direction of gaseous flow, the corrugations of said separators forming channels with said layers with said channels being so constructed and arranged to be adapted to extend in the general direction of gaseous flow, the corrugations of adjacent separators being angularly disposed with respect to one another and being arranged in relatively opposite relationship with the respective crests intersecting so as to prevent nesting of adjacent separators, whereby the layers of filtering material are maintained in relatively spaced and extended relationship to provide maximum air flow and to minimize flutter and vibration and the fatigue-rupturing resulting therefrom.

2. The invention, in accordance with claim 1, wherein the corrugations of said separators have progressively decreasing crest heights, the maximum corrugation crest height of each of said separators being disposed adjacent the reduced corrugation crest height of an adjacent separator for increasing the effective filtering area of said layers for a particular frontal area of said filter through which said gaseous stream is to flow, and the effective width of said filter, constituting the sum of the thicknesses of said layers plus the sum of the effective crest heights of the corrugations of said separators, being less than the sum of said thicknesses of said layers, plus the sum of the maximum crest heights of said corrugation of said separators.

3. The invention, in accordance with claim 2, wherein means are provided on said separators adjacent their ends having reduced corrugation crest heights for assuring maximum filtering area of said layers.

References Cited in the file of this patent

UNITED STATES PATENTS

| | | |
|---|---|---|
| 2,008,751 | Davies | July 23, 1935 |
| 2,020,120 | Leathers | Nov. 5, 1935 |
| 2,252,242 | Wood | Aug. 12, 1941 |
| 2,720,937 | Root | Oct. 18, 1955 |
| 2,764,258 | Bub et al. | Sept. 25, 1956 |

FOREIGN PATENTS

| | | |
|---|---|---|
| 817,314 | France | Feb. 3, 1937 |
| 536,592 | Belgium | Sept. 17, 1955 |